United States Patent
Cannon

(10) Patent No.: US 6,285,166 B1
(45) Date of Patent: Sep. 4, 2001

(54) BATTERY CHARGER WITH IMPROVED OVERCHARGE PROTECTION MECHANISM AND METHOD OF OPERATION THEREOF

(75) Inventor: Joseph M. Cannon, Harleysville, PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/534,145

(22) Filed: Mar. 23, 2000

(51) Int. Cl.7 .......................... H01M 10/46; H01M 10/44
(52) U.S. Cl. .............................. 320/134; 320/159
(58) Field of Search ................... 320/124, 125, 320/137, 134, 155, 157, 158, 159, 160, 162, 163

(56) References Cited

U.S. PATENT DOCUMENTS 4,118,661 * 10/1978 Siekierski et al. .

* cited by examiner

*Primary Examiner*—Edward H. Tso

(57) ABSTRACT

A battery charger with improved overcharge protection mechanism and method of charging a battery with such charger. In one embodiment, the charger includes: (1) a voltage sensor for sensing a voltage of a battery that the battery charger is charging and (2) a controller, coupled to the voltage sensor, that adjusts a charge mode of the battery charger when samples of the voltage taken over a predetermined period of time are within a predetermined range thereby to prevent overcharging of the battery.

20 Claims, 3 Drawing Sheets

BATTERY CHARGER WITH IMPROVED OVERCHARGE PROTECTION MECHANISM AND METHOD OF OPERATION THEREOF

TECHNICAL FIELD OF THE INVENTION

The present invention is directed, in general, to battery chargers and, more specifically, to a battery charger with improved overcharge protection mechanism and method of charging a battery with such charger.

BACKGROUND OF THE INVENTION

Cordless telephones have become a staple in today's homes. They offer nearly the portability of a cellular telephone, but cost no more to use than a wireline telephone.

Cordless telephones consist of a base and a handset, each containing a wireless transceiver. The base plugs into a wireline telephone jack and derives its power from a wall outlet. The handset is battery-powered. The base often provides a cradle for the handset to allow the handset to be conveniently stored and recharged.

The number of cordless telephones is and has been rapidly increasing due to user demands for higher mobility and broader general utility. This has resulted in a higher demand for improved performance from the rechargeable batteries to allow the telephones to be operationally available for a greater percentage of the time. Conventional battery charging and monitoring systems are focused on simplicity of operation, regardless of any degenerative impact that the systems may have on the batteries themselves. For example, a conventional battery charging and monitoring system may provide a fixed charging current during the charging period. This fixed charging current is typically maximized to assure that the batteries are charged quickly. Alternatively, a battery may be charged only by a trickle current, which may not damage the battery, but requires an unacceptably long period of time to charge a fully discharged battery.

In spite of these problems, an even more critical problem exists. Batteries quick-charged for faster availability are often at risk of being overcharged. Overcharging a battery usually results in partial, or even permanent, damage to the battery. In addition, overcharging results in a waste of electricity.

To address this problem, prior art battery chargers attempted to detect when the battery was fully charged so they could prevent overcharging and damaging the battery. Designers of such battery chargers noticed that batteries tend to exhibit a small, but detectible, drop in their terminal voltage when they reach a full charge.

Unfortunately, not all batteries exhibit a detectible voltage drop. In fact, some batteries exhibit no drop whatsoever. To complicate matters, battery characteristics change over time. Batteries that may have exhibited detectible drops at one time, now no longer may. These facts kept prior art battery chargers from being able to detect full charges reliably for all batteries that they may be called upon to charge.

Accordingly, what is needed in the art is a battery charger, and related method, that can more reliably determine when a battery is fully charged. In addition, what is needed in the art is a cordless telephone set that incorporates the charger or the method.

SUMMARY OF THE INVENTION

To address the above-discussed deficiencies of the prior art, the present invention provides a battery charger with improved overcharge protection mechanism and method of charging a battery with such charger. In one embodiment, the charger includes: (1) a voltage sensor for sensing a voltage of a battery that the battery charger is charging and (2) a controller, coupled to the voltage sensor, that adjusts (or terminates) a charge mode (such as a quick charge mode) of the battery charger when samples of the voltage taken over a predetermined period of time are within a predetermined range thereby to prevent overcharging of the battery.

The present invention rests on the recognition that batteries do not always exhibit a dramatic voltage drop when they reach full charge. Instead, they sometimes simply maintain a relatively constant voltage. Prior art battery chargers that quick-charge until they detect the voltage drop continue to quick-charge after the battery has been fully charged, wasting power, generating heat and potentially harming the battery. The present invention instead recognizes the substantial constancy of the voltage as indicating a full charge and adjusts (or completely terminates) the charge mode in response. The present invention enjoys substantial utility in avoiding the waste of power, generation of heat and risk of battery damage that the prior art realizes.

In one embodiment of the present invention, the predetermined period of time is at least 10 minutes. In an embodiment to be illustrated and described, the predetermined period of time is 30 minutes. Six samples taken at five-minute-long periodic intervals are filtered, smoothed or compared to a range of allowable reference voltages to determine whether the sensed voltage is constant enough to recognize that the battery has been fully charged and terminate quick-charging as a result.

In one embodiment of the present invention, the controller enters a trickle charge mode of the battery charger when the samples taken over the predetermined period of time remain within the predetermined range. Those skilled in the art are familiar is with quick charge and trickle charge modes for battery chargers. The present invention makes advantageous use of such known modes and improves substantially upon the conditions under which such modes are selected. Of course, later-discovered quick charge and trickle charge modes fall within the broad scope of the present invention.

In one embodiment of the present invention, the controller alternatively terminates the quick charge mode when the voltage drops by at least a predetermined amount between successive ones of the samples. As stated above, some batteries do not exhibit a voltage drop upon attaining full charge; others do. Accordingly, in one embodiment to be illustrated and described, the battery charger looks for either voltage constancy or drop, taking either as an indicator of full charge.

In one embodiment of the present invention, the controller alternatively terminates the quick charge mode upon expiration of a predetermined maximum charge time. This watchdog function ensures that the quick charge mode does not continue indefinitely. In an embodiment to be illustrated and described, the predetermined maximum charge time is about four hours.

In one embodiment of the present invention, the controller takes the samples at periodic intervals. Of course, the controller may take samples aperiodically. The present invention does not require a certain number of samples, a particular period of time or periodicity in sampling.

In one embodiment of the present invention, the battery charger is part of a cordless telephone base and the battery is part of a cordless telephone handset. Those skilled in the pertinent art will realize, however, that the present invention will find wide-ranging use in a variety of applications that employ rechargeable batteries.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
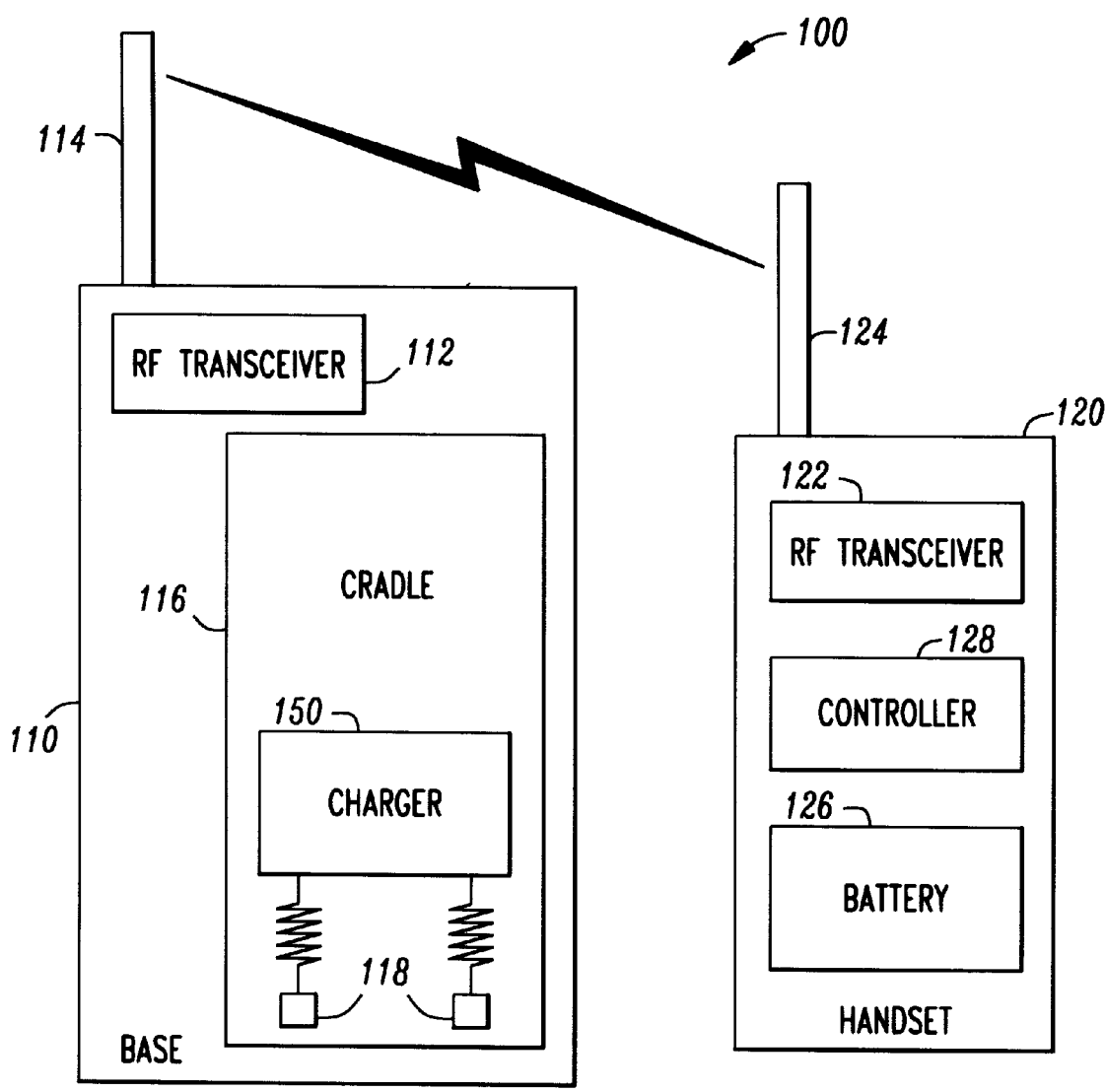
FIG. 1 illustrates a cordless telephone set that can incorporate a battery charger constructed according to the principles of the present invention.

Referring initially to FIG. 1, illustrated is a cordless telephone set 100 that can incorporate a battery charger 150 constructed according to the principles of the present invention. The telephone set 100 comprises a base 110 and a handset 120.

The base 110 includes an RF transceiver 112 and an antenna 114. The base 110 further includes a cradle 116 for holding the handset 120 when not in use. The handset 120 includes its own RF transceiver 122 and antenna 124. The handset 120 further includes a battery 126 for storing the electrical current needed to operate the telephone 100. The handset 120 still further includes a controller 128, constructed according to the principles of the present invention, for use with the charger 150 and battery 126.

The charger 150 in the base 110 includes contacts 118 for providing recharging current from the charger 150 to the battery 126 in the handset 120 when the handset 120 is cradled in the base 110. In addition, the controller 128 is employed to control the state in which the charger 150 provides the recharging current to the battery 126, in addition to determining when the battery 126 has been fully charged.

Figure 2:
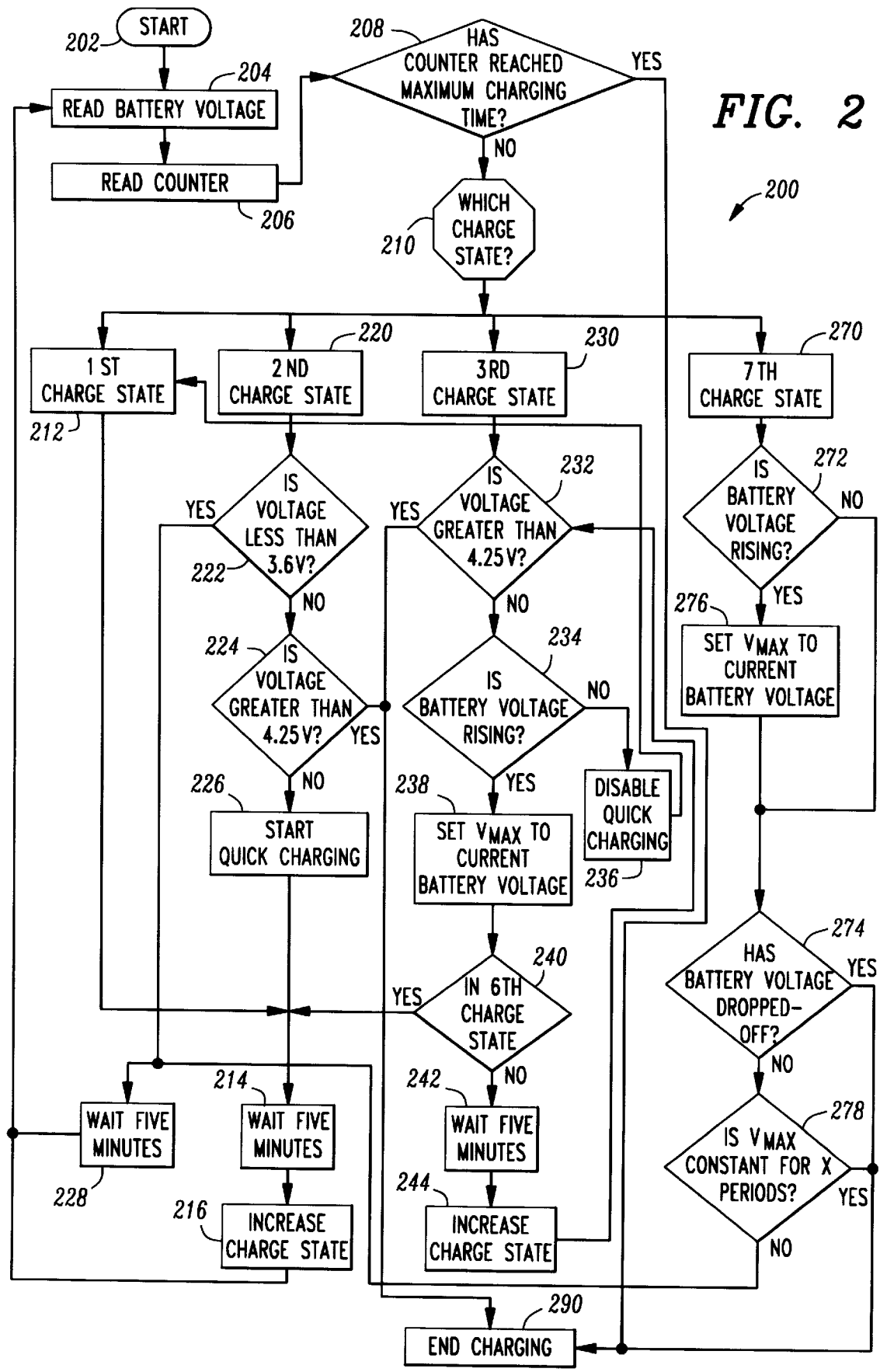
FIG. 2 illustrates a flow diagram of charge states that the charger of FIG. 1 can attain and the conditions under which the charger changes charge states.
Figure 3:
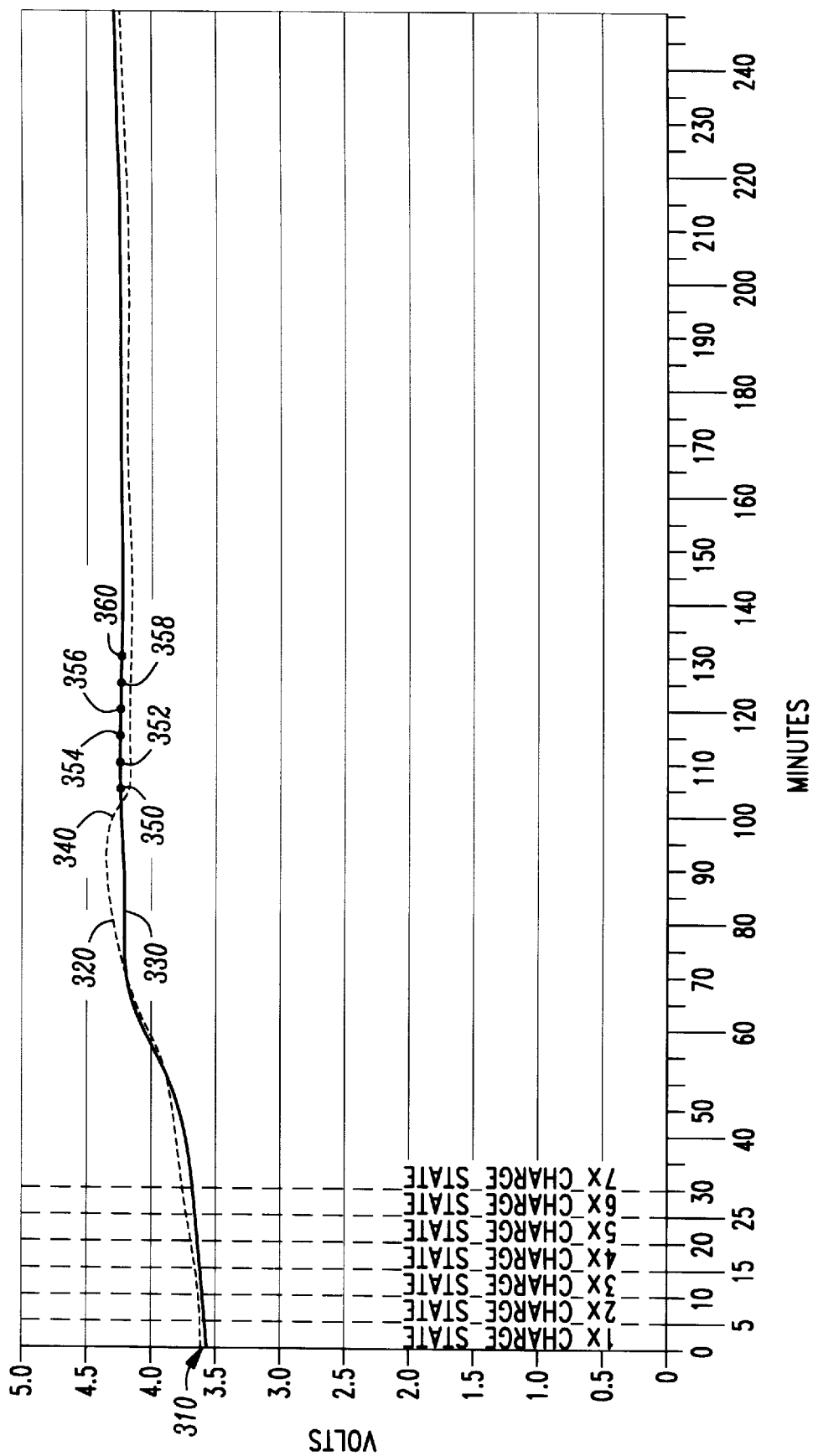
FIG. 3 illustrates a graphical representation of battery voltage as a function of time as a battery is charged according to the principles of the present invention.

Turning now jointly to FIG. 2 and FIG. 3, illustrated are a flow diagram 200 of charge states that the charger 150 of FIG. 1 can attain and the conditions under which the charger 150 changes charge states (FIG. 2) and a graphical representation 300 of battery voltage as a function of time as a battery 126 is charged according to the principles of the present invention (FIG. 3). The flow diagram 200 begins in a start step 202. The start step 202 corresponds to a starting point 310, arbitrarily established at zero minutes, in FIG. 3. A voltage sensor samples the voltage in the battery 126 being charged in a step 204. As can be seen in FIG. 3, the voltage of the battery 126 can range between 0.0 and 5.0 volts.

FIG. 3 illustrates both first and second battery voltage curves 320, 330. The first battery voltage curve 320 represents a first example in which the voltage of the battery 126 exhibits a small but detectable drop in voltage 340 (for example, 30 millivolts) when the battery 126 has reached full charge. The second battery voltage curve 330 represents a second example in which the voltage of the battery 126 does not exhibit a detectible small drop in voltage 340 when the battery 126 reaches full charge.

Turning back to FIG. 2, an internal counter (not illustrated), which may be a counter that uses an existing 8 kHz digital cordless telephone sampling clock, is read in a step 206. The counter reading is used to determine whether the battery 126 has been quick charging for longer than a predetermined period in a step 208.

If the battery 126 is determined to have been quick charging for the maximum charging time (for example, four hours), the quick charging process ends in a step 290, and trickle charging is reinstated, to prevent possible damage to the battery 126 due to overcharging. The approximate four hour maximum corresponds to the 240+ minutes illustrated along the x-axis of FIG. 3. If the battery 126 has not exceeded the maximum charging time, the controller 128 must then determine by which charge state the battery 126 is being charged in a step 210. Although the maximum charging time is illustrated as approximately four hours, the present invention is broad enough to encompass any maximum charging time.

In a step 212, the battery 126 is trickle charged. For example, each time the telephone handset 120 is placed back into the cradle 116 for charging, the controller 128 initially sets the charger 150 to charge the battery 126 with a trickle charge. FIG. 3 designates this first charge state as "1× Charge State."

In a step 214, the battery 126 is allowed to trickle charge for five minutes. After the five minutes expires, the process advances to a second charge state (a step 216), and then returns to the step 204. FIG. 3 designates this second charge state as "2× Charge State."

After the battery voltage is again read in the step 204 and the counter is read in the step 206, it is concluded that the battery 126 has not been quick charging past the four hours in the step 208. Specifically, because quick charging has not started, the counter will not have reached the maximum charging time. In the step 210, since the charger 150 has been incremented by one charge state, the process moves to a step 220. Then, it is determined whether the voltage of the battery 126 is below a minimum operating voltage for the telephone 100 in a step 222. Although the minimum operating voltage of the telephone 100 is 3.6 volts in the illustrated embodiment, the present invention is broad enough to encompass any minimum operating voltage for whatever device into which the battery 126 is placed.

If the voltage is determined to be less than 3.6 volts, the battery 126 is considered not fit for quick charging and must continue to be trickle charged. In this case, the process advances to a step 228 before returning to the step 220. The charger 150 remains in the second charge state until the battery voltage is greater than the minimum operating voltage. Thus, the second charge state is used to determine if the battery 126 is capable of obtaining the capacity necessary to operate the telephone 100.

In FIG. 3, both the first and second battery voltage curves 320, 330 are illustrated as being greater than 3.6 volts. As a result, the process continues to a step 224. Although in the illustrated embodiment the full charge of the battery 126 is 4.25 volts, the present invention is broad enough to encompass any full charge voltage. If the battery voltage is determined to be greater than 4.25 volts, the battery 126 is found to be fully charged; thus, quick charging of the battery 126 is not required. The method then advances to the step 290 and trickle charging is reinstated.

However, if the battery 126 is not found to be greater than 4.25 volts, the controller 128 sets the charger 150 to quick charge the battery 126 in a step 226. In addition, in the step 226, the internal quick charge counter described above is started, and a maximum reference voltage ($V_{MAX}$) is established using the current voltage of the battery 126. $V_{MAX}$ will be used later to help determine the charge held by the battery 126.

In FIG. 3, the first and second battery voltage curves 320, 330 are not greater than 4.25 volts. Thus, the process continues with the step 214, then to the step 216, and then to the step 204.

After the battery voltage is again read in the step 204 and the counter is read in the step 206, it is again determined that the battery 126 has not been quick charging past the four hours in the step 208, since quick charging only began five minutes earlier. In the step 210, the charger 150 is now determined to be in the third charge state, so the process moves to a step 230. FIG. 3 designates the third charge state as "3× Charge State."

Then, it is again determined whether the voltage of the battery 126 is fully charged in a step 232. If the battery 126 is determined to be fully charged, quick charging of the battery 126 ceases at the step 290 and trickle charging is reinstated. However, if the battery voltage is not greater than 4.25 volts, it is determined whether voltage in the battery 126 is rising in a step 234.

Specifically, the current battery voltage read at the beginning of this third charge state is compared to the $V_{MAX}$ established during the second charge state. If the current battery voltage is not greater than the $V_{MAX}$, thus the battery 126 is not charging, a problem with the battery 126 is assumed and quick charging is halted in a step 236. At this point, the process is returned to the step 212 for more trickle charging. In addition, the quick charge counter is halted in the step 236, since quick charging ceases once the process is returned to the first charge state.

In FIG. 3, both the first and second battery voltage curves 320, 330 are illustrated as rising during the third charge state. Thus, because voltage in the battery 126 is rising, $V_{MAX}$ is set to the current battery voltage in a step 238. It is then determined whether the process is in a sixth charge state in a step 240. If the charger is determined to be in the sixth charge state, the process continues to the step 214, and then to the step 216, before returning to the step 204. If the charger is not determined to be in the sixth charge state, the process moves to a step 242, and then to a step 244, before returning to the step 232. Referring back to FIG. 3, because the first and second battery voltage curves 320, 330 are still in the third charge state, the process would follow the latter branch.

Once back in the step 232, the charger is now in the fourth charge state, which FIG. 3 designates as "4× Charge State." However, during the fourth charge state, the process follows the same path as the third charge state. Although now in the fourth charge state, when the process reaches the step 240, the answer will again be NO and the process will again go to the step 242 and the step 244 before returning to follow the same path again.

The charger will now be in the fifth charge state, which FIG. 3 designates as "5× Charge State," but will again be returned to the step 232 to follow the same path. After returning this time, the charger is in the 6th charge state, which FIG. 3 designates as "6× Charge State," when it reaches the step 240. Because the charger is now in the sixth charge state, the process continues to the step 214, and then to the step 216, before returning to the step 204, as discussed above.

After the battery voltage is again read in the step 204 and the counter is read in the step 206, it must again be determined that the battery 126 has not been quick charging past the four hours in the step 208. Referring to the first and second battery voltage curves 320, 330 in FIG. 3, the process would only be at the 30 minute point, far short of the four hour maximum charging time. In the step 210, the charger 150 is now determined to be in the seventh charge state, so the process moves to a step 270. FIG. 3 designates the seventh charge state as "7× Charge State.

Then, it is again determined whether the battery voltage is continuing to rise in a step 272. This is again determined by comparing the current battery voltage with the last recorded $V_{MAX}$. If the battery voltage is not found to be rising, it must be determined whether the battery 126 is fully charged in a step 274. However, if the battery voltage is determined to be rising, the $V_{MAX}$ is set to the current battery voltage in a step 276. The new $V_{MAX}$ is then used to determine whether the battery 126 is fully charged in a step 278.

In the step 274, it is determined whether the battery 126 has reached full charge by determining if the current battery voltage has dropped below $V_{MAX}$ by a preset value. The preset amount may be 0.3 volts, however the present invention is not limited to any particular value. As previously described, once a battery has reached full charge, the voltage of the battery will often demonstrate a slight, but detectable, drop from peak voltage reached during charging. Unfortunately, not all batteries demonstrate such a drop in voltage, rendering sole use of this method inadequate. If the battery voltage has dropped below the $V_{MAX}$ by the preset amount, the battery 126 is found by the voltage drop method to be fully charged, and the process continues to the step 290.

However, if the battery voltage does not detectably drop after reaching full charge, the process advances to the step 278 in which it is determined whether $V_{MAX}$ a remains relatively constant for predetermined periods of time. If, in the step 278, the battery 126 is determined to be fully charged, the process moves to the step 290, since no further quick charging is required. If $V_{MAX}$ is not constant for the preset periods of time, the process advances to the step 228, to the step 204, to the step 210 and back to the step 270. Then, the above-described process for the seventh charge state is repeated until the battery 126 is fully charged.

For example, the charger 150 may determine that the battery 126 is fully charged when its voltage remains constant for six five-minute periods. In this example, and referring back to the second battery voltage curve 330, the voltage begins to level off at a first period 350. Five minutes later, the voltage remains relatively constant at a second period 352. The voltage continues to remain relatively constant through third 354, fourth 356, fifth 358 and sixth 360 periods, each at five-minute intervals. Since the second battery voltage curve 330 does not demonstrate the measurable drop in voltage 340, the prior method discussed above could not determine whether the battery 126 is fully charged. However, because the voltage remained relatively constant for the predetermined periods, a controller 128 employing this second method would determine that the battery 126 had reached full charge and cease its quick charging. Whether the voltage remains relatively constant can be determined by filtering, quantizing, averaging or truncating the current battery voltage. Of course, the present invention is not limited to a particular manner for determining whether the battery voltage has remained relatively constant for the preset period. By having this second method to cease quick charging when the battery 126 is fully charged, the charger 150 avoids the damage and waste associated with overcharging the battery 126 mentioned above.

Although in this example the first period of constant voltage occurs at approximately 115 minutes of quick charging, the present invention is not so limited. Thus, when the voltage of a charging battery becomes relatively constant can occur at any time during the charging process, limited only by the original charge left in the battery 126 when charging commences. In addition, the present invention is not limited to periods spaced at five-minute intervals. Accordingly, a charger 150 having a controller 128 employed to detect a fully charged battery 126 constructed according to the principles of the present invention can detect a constant voltage over any given time period.

Therefore, according to a controller 128 incorporating the present invention, the battery 126 is determined to be fully charged by one of two methods. First, if the battery 126 demonstrates a drop in voltage 340 when it reaches full charge, a method designed to detect this drop in voltage 340 is employed. However, if the battery 126, even when fully charged, does not demonstrate such a drop in voltage 340, the battery 126 may continue to be quick charged for the full four hours, or whatever maximum time quick charging is permitted. In this case, a second method designed to detect whether the peak battery voltage has become relatively constant is employed to determine when the battery 126 is fully charged.

Although the present invention has been described in detail, those skilled in the art should understand that they can make various changes, substitutions and alterations herein without departing from the spirit and scope of the invention in its broadest form.

What is claimed is:

1. A battery charger, comprising:
    a voltage sensor for sensing a voltage of a battery that said battery charger is charging; and
    a controller, coupled to said voltage sensor, that adjusts a charge mode of said battery charger when samples of said voltage taken over a predetermined period of time are within a predetermined range thereby to prevent overcharging of said battery.

2. The charger as recited in claim 1 wherein said predetermined period of time is at least 10 minutes.

3. The charger as recited in claim 1 wherein said controller enters a trickle charge mode of said battery charger when said samples taken over said predetermined period of time remain within said predetermined range.

4. The charger as recited in claim 1 wherein said controller alternatively adjusts said charge mode when said voltage drops by at least a predetermined amount between successive ones of said samples.

5. The charger as recited in claim 1 wherein said controller alternatively adjusts said charge mode upon expiration of a predetermined maximum charge time.

6. The charger as recited in claim 1 wherein said controller takes said samples at periodic intervals.

7. The charger as recited in claim 1 wherein said battery charger is part of a cordless telephone base and said battery is part of a cordless telephone handset.

8. A method of charging a battery, comprising:
    charging said battery;
    sensing a voltage of said battery; and
    adjusting said charging when samples of said voltage taken over a predetermined period of time are within a predetermined range thereby to prevent overcharging of said battery.

9. The method as recited in claim 8 wherein said predetermined period of time is at least 10 minutes.

10. The method as recited in claim 8 wherein said controller enters a trickle charge mode of said battery charger when said samples taken over said predetermined period of time remain within said predetermined range.

11. The method as recited in claim 8 wherein said controller alternatively adjusts said charge mode when said voltage drops by at least a predetermined amount between successive ones of said samples.

12. The method as recited in claim 8 wherein said controller alternatively adjusts said charge mode upon expiration of a predetermined maximum charge time.

13. The method as recited in claim 8 wherein said controller takes said samples at periodic intervals.

14. The method as recited in claim 8 wherein said battery charger is part of a cordless telephone base and said battery is part of a cordless telephone handset.

15. A cordless telephone, comprising:
    a handset having:
        handset wireless communication circuitry,
        a battery that powers said handset wireless communication circuitry, and
        a base interface; and
    a base having:
        base wireless communication circuitry,
        a handset interface removably couplable to said base interface to allow said battery to receive charge current from said base, and
        a battery charger having a voltage sensor for sensing a voltage of said battery and a controller, coupled to said voltage sensor, that terminates a quick charge mode of said battery charger when samples of said voltage taken over a predetermined period of time remain within a predetermined range thereby to prevent overcharging of said battery.

16. The telephone as recited in claim 15 wherein said predetermined period of time is at least 10 minutes.

17. The telephone as recited in claim 15 wherein said controller enters a trickle charge mode of said battery charger when said samples taken over said predetermined period of time remain within said predetermined range.

18. The telephone as recited in claim 15 wherein said controller alternatively terminates said quick charge mode when said voltage drops by at least a predetermined amount between successive ones of said samples.

19. The telephone as recited in claim 15 wherein said controller alternatively terminates said quick charge mode upon expiration of a predetermined maximum charge time.

20. The telephone as recited in claim 15 wherein said controller takes said samples at periodic intervals.

* * * * *